United States Patent
Park et al.

(10) Patent No.: US 9,742,937 B2
(45) Date of Patent: *Aug. 22, 2017

(54) IMAGE FORMING SYSTEM, METHOD OF CONTROLLING IMAGE FORMING APPARATUS BY USING MESSENGER APPLICATION OF MOBILE DEVICE, AND THE MOBILE DEVICE FOR PERFORMING METHOD

(71) Applicant: Samsung Electronics Co., Ltd., Suwon-si, Gyeonggi-do (KR)

(72) Inventors: Jeong-jin Park, Seongnam-si (KR); Jae-young Soh, Suwon-si (KR); Hong-rok Woo, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,011

(22) Filed: Jul. 20, 2016

(65) Prior Publication Data

US 2016/0330336 A1    Nov. 10, 2016

Related U.S. Application Data

(63) Continuation of application No. 14/560,657, filed on Dec. 4, 2013, now Pat. No. 9,432,527.

(30) Foreign Application Priority Data

Dec. 16, 2013    (KR) .................. 10-2013-0156641

(51) Int. Cl.
*G06F 3/12* (2006.01)
*H04N 1/00* (2006.01)

(52) U.S. Cl.
CPC ..... *H04N 1/00312* (2013.01); *H04N 1/00244* (2013.01); *H04N 1/00307* (2013.01);
(Continued)

(58) Field of Classification Search
CPC .......... H04N 1/32106; H04N 1/00323; H04N 1/00042; H04N 1/00244; H04N 1/00204;
(Continued)

(56) References Cited

U.S. PATENT DOCUMENTS 7,239,871 B2    7/2007   Shamp et al.
8,108,458 B2    1/2012   Aldrey et al.
(Continued)

OTHER PUBLICATIONS

U.S. Office Action issued Jun. 3, 2015 in corresponding U.S. Appl. No. 14/560,657.

(Continued)

*Primary Examiner* — Gabriel Garcia
(74) *Attorney, Agent, or Firm* — Staas & Halsey LLP

(57) ABSTRACT

An image forming system to control an image forming apparatus by using a messenger application, a mobile device, and a method are provided. The image forming system includes a mobile device to activate a chat user interface to interface with an account of the image forming apparatus on the messenger application, and sending user messages to control a printing function of the image forming apparatus, a cloud server to receive the user messages from a messenger server, providing response messages of the account of the image forming apparatus in response to the user messages, and communicating with the mobile device in a conversational manner, thus controlling the printing of the image forming apparatus, and an image forming apparatus whose printing is controlled by the cloud server based on the user messages or providing monitoring information of a current status.

3 Claims, 16 Drawing Sheets

(52) U.S. Cl.
CPC . *H04N 1/00344* (2013.01); *H04N 2201/0075* (2013.01); *H04N 2201/0094* (2013.01)

(58) Field of Classification Search
CPC ........... H04N 1/00209; H04N 1/32128; H04N 1/00477; H04N 1/00411; H04N 1/00307; H04N 2201/0094
USPC ............. 358/1.1, 1.13, 1.14, 1.15, 402, 403; 709/201, 203, 219, 220
See application file for complete search history.

(56) References Cited

U.S. PATENT DOCUMENTS

| | | | |
|---|---|---|---|
| 9,432,527 B2 * | 8/2016 | Park | H04N 1/00307 |
| 2005/0102362 A1 | 5/2005 | Price et al. | |
| 2005/0162685 A1 | 7/2005 | Heiles et al. | |
| 2005/0168772 A1 | 8/2005 | Kim | |
| 2006/0176504 A1 | 8/2006 | Burke et al. | |
| 2007/0043878 A1 | 2/2007 | Carlson et al. | |
| 2007/0168480 A1 | 7/2007 | Biggs et al. | |
| 2011/0176162 A1 | 7/2011 | Kamath | |
| 2011/0299110 A1 | 12/2011 | Jazayeri et al. | |
| 2012/0254624 A1 | 10/2012 | Malkhasyan et al. | |
| 2012/0293826 A1 | 11/2012 | Saurabh | |
| 2013/0021640 A1 | 1/2013 | Tamura | |
| 2013/0077129 A1 | 3/2013 | Soh et al. | |
| 2014/0146355 A1 | 5/2014 | Kawara | |

OTHER PUBLICATIONS

U.S. Office Action issued Feb. 2, 2016 in corresponding U.S. Appl. No. 14/560,657.
U.S. Notice of Allowance issued May 17, 2016 in corresponding U.S. Appl. No. 14/560,657.
U.S. Appl. No. 14/560,657, filed Dec. 4, 2014, Jeong-jin Park et al., Samsung Electronics Co., Ltd.

* cited by examiner

FIG. 2C

| Token | Action |
|---|---|
| "프린터" | PRINTER |
| "printer" | PRINTER |
| " SEARCH" | SEARCH |
| "@" | USER |
| NUMBER INPUT VALUE | SELECTION |
| "TONER" | RESOURCE |
| STATUS | CHECK |
| ... | ... |

IMAGE FORMING SYSTEM, METHOD OF CONTROLLING IMAGE FORMING APPARATUS BY USING MESSENGER APPLICATION OF MOBILE DEVICE, AND THE MOBILE DEVICE FOR PERFORMING METHOD

CROSS-REFERENCE TO RELATED APPLICATIONS

This application is a continuation application of U.S. application Ser. No. 14/560,657, filed on Dec. 4, 2014, now U.S. Pat. No. 9,432,527, which is related to and claims priority benefit to Korean Patent Application No. 10-2013-0156641, filed on Dec. 16, 2013, in the Korean Intellectual Property Office, the disclosures of which are incorporated herein in its entirety by reference.

BACKGROUND

1. Field

One or more embodiments relate to a method of controlling an image forming apparatus by using a message application of a mobile device, and a mobile device to perform the method.

2. Description of the Related Art

Users communicate by using, for example, a home page, an e-mail, etc. as various information transfer media. However, users may not communicate with a target user in real time using such forms of communication. An instant messenger (i.e., a messenger) may be useful for transferring information in real time via the Internet. The instant messenger attempts to transfer a simple message between users in real time. When the messenger is used, two users may chat in real time through texts transferred, as if they personally converse with each other. As the messenger instantly transfers input content of a message, the real-time feature of the message is regarded as being important. A messenger application may provide a function of transmitting emoticons, flashcons, giftcons, etc. to a conversation participant through a conversation window or a chat window or a function of transmitting a file using the conversation window as well as transferring a message.

SUMMARY

One or more embodiments include a method of controlling an image forming apparatus by using a message application of a mobile device, and the mobile device to perform the method.

One or more embodiments include a computer-readable recording medium having recorded thereon a program for executing the method.

Additional aspects will be set forth in part in the description which follows and, in part, will be apparent from the description, or may be learned by practice of the presented embodiments.

According to one or more embodiments, a mobile device to control an image forming apparatus by using a messenger application includes a user interface unit to activate a chat user interface to interface with an account of the image forming apparatus corresponding to the image forming apparatus on the messenger application, a network interface unit to send user messages to control a printing function of the image forming apparatus, which are input through the activated chat user interface, and a control unit to control the printing function of the image forming apparatus by communicating with the image forming apparatus in a conversational manner according to response messages of the account of the image forming apparatus in response to the input user messages.

According to one or more embodiments, a method of controlling an image forming apparatus by using a messenger application of a mobile device includes activating a chat user interface to interface with an account of the image forming apparatus corresponding to the image forming apparatus on the messenger application, sending user messages to control a printing function of the image forming apparatus, which are input through the activated chat user interface; and controlling the printing function of the image forming apparatus by communicating with the image forming apparatus in a conversational manner according to response messages of the account of the image forming apparatus in response to the input user messages.

According to one or more embodiments, a non-transitory computer-readable recording medium having embodied thereon a program for executing the method described above is included.

According to one or more embodiments, a image forming system to control an image forming apparatus by using a messenger application includes a mobile device to activate a chat user interface to interface with an account of the image forming apparatus on the messenger application, and sending user messages to control a printing function of the image forming apparatus, a cloud server to receive the user messages from a messenger server, providing response messages of the account of the image forming apparatus in response to the user messages, and communicating with the mobile device in a conversational manner, thus controlling the printing function of the image forming apparatus, and an image forming apparatus whose printing function is controlled by the cloud server based on the user messages or providing monitoring information of a current status.

BRIEF DESCRIPTION OF THE DRAWINGS

These and/or other aspects will become apparent and more readily appreciated from the following description of the embodiments, taken in conjunction with the accompanying drawings in which:

FIG. 2C is a table illustrating an action map used to parse a user message in a bot server according to an embodiment;

DETAILED DESCRIPTION

Figure 1:
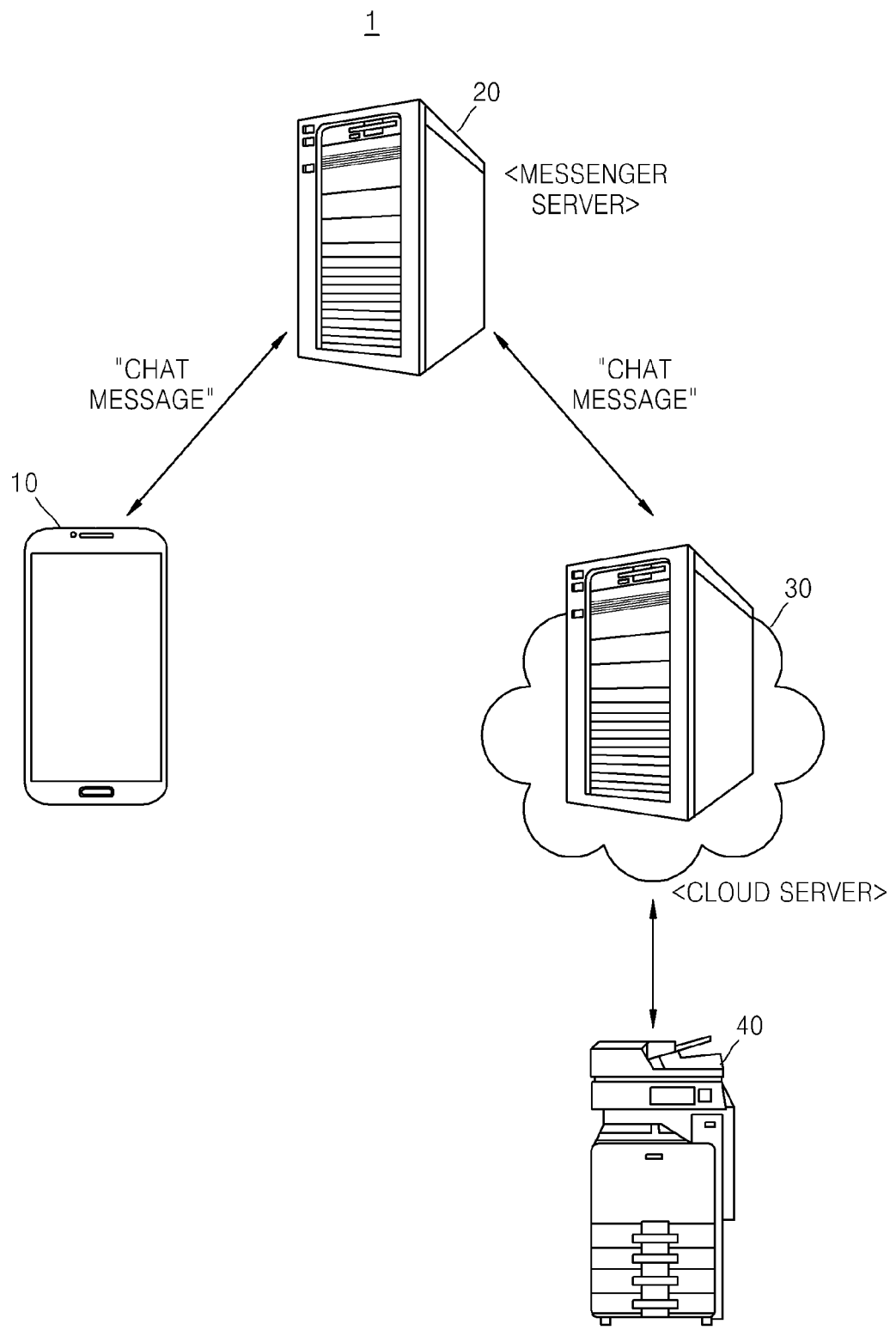
FIG. 1 illustrates an image forming system according to an embodiment.

Reference will now be made in detail to embodiments, examples of which are illustrated in the accompanying drawings, wherein like reference numerals refer to like elements throughout. The present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

FIG. 1 illustrates an image forming system 1 according to an embodiment. Referring to FIG. 1, a mobile device 10, a message server 20, a cloud server 30, and an image forming apparatus 40 are provided to the image forming system 1.

Although the mobile device 10, the message server 20, the cloud server 30, and the image forming apparatus 40 are provided to the image forming system 1 of FIG. 1, for convenience of description, the present embodiment is not limited thereto. One or more various types of mobile devices 10, message servers 20, cloud servers 30, and image forming apparatuses 40 may be provided.

In other words, exemplary hardware components are illustrated in order not to obscure the characteristics of the embodiment in FIG. 1. However, it will be understood by one of ordinary skill in the art that general-use hardware components, for example, an access point (AP), a network hub, etc., other than the hardware components shown in FIG. 1, may also be provided.

The image forming apparatus 40 may be an individual device, such as a printer, a scanner, a copier, or a facsimile, or the like, or may correspond to a multifunction product (MFP) that incorporates various functions of the above different devices into one device.

The mobile device 10 may correspond to a device, such as a smart phone, a tablet device, a personal digital assistant (PDA), a notebook, a personal computer (PC), or the like.

The mobile device 10 may correspond to a device in which commercial messenger applications, such as Kakao Talk, WhatsApp, Facebook Messenger, and the like, may be installed.

The messenger server 20 may correspond to a server that is run by a provider to provide types of commercial messenger applications.

The cloud server 30, which is a server that manages the image forming apparatus 40, mediates messages transmitted and received between the image forming apparatus 40 and the mobile device 10 via the messenger server 20.

Each of the mobile devices 10, the message servers 20, the cloud servers 30, and the image forming apparatuses 40 that are provided to the image forming system 1 may have wired and/or wireless communication functions. Thus, each of the mobile devices 10, the message servers 20, the cloud servers 30, and the image forming apparatuses 40 may utilize the wired and/or wireless communication functions that are supported by a device itself to form a wired and/or wireless network that is connected to each other. That is, as long as the image forming system 1 connected over the wired and/or wireless network is established, it will be understood by one of ordinary skill in the art that various y wired or wireless networks may be used.

When the mobile device 10 executes the messenger application in the image forming system 1, the mobile device 10 may control the image forming apparatus 40 by using a chatting method of conversing by transmitting/receiving messages between a user's account and an account of the image forming apparatus 40 corresponding to the image forming apparatus 40 through the executed messenger application. The image forming apparatus 40 pushes and provides information regarding a current status of the image forming apparatus 40 to the messenger application of the mobile device 10 in a message form, and thus a user of the mobile device 10 may more easily manage the current status of the image forming apparatus 40.

Figure 2A:
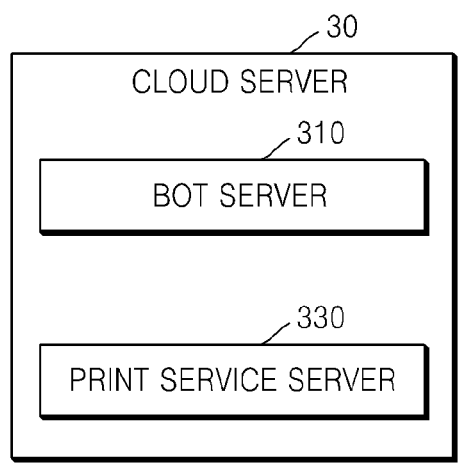
FIG. 2A illustrates a hardware configuration of a cloud server according to an embodiment.

FIG. 2A illustrates the cloud server 30 according to an embodiment. Referring to FIG. 2A, the cloud server 30 includes a bot server 310 and a print service server 330.

The bot server 310 communicates with the messenger server 20 that provides a service relating to a messenger application to transmit and receive messages.

The image forming apparatus 40 may not actively compose a message like a user, because the image forming apparatus 40, itself, is a machine. Thus, the bot server 310 parses user messages transmitted from the mobile device 10 by using an account of the image forming apparatus 40 corresponding to the image forming apparatus 40, and generate response messages of the account of the image forming apparatus 40 corresponding to the user messages. That is, the bot server 310 automatically feeds back the response messages to the user messages in place of the image forming apparatus 40 by using a messenger application of the mobile device 10.

Figure 2B:
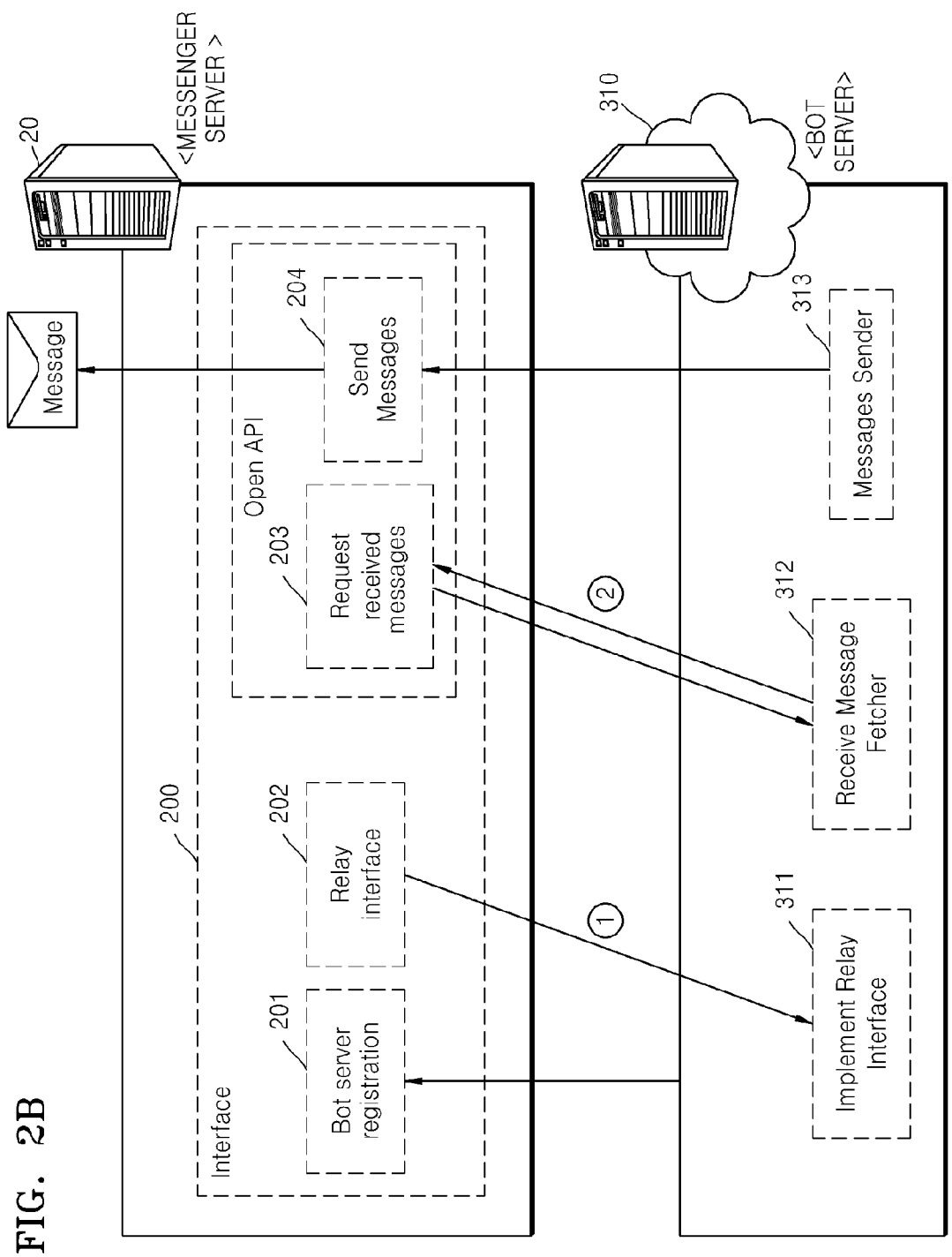
FIG. 2B illustrates a communication method preformed between a bot server and a messenger server according to an embodiment.

FIG. 2B illustrates a communication method preformed between the bot server 310 and the messenger server 20 according to an embodiment. Referring to FIG. 2B, the messenger server 20 includes various types of interface 200 to communicate with the bot server 310.

A bot server registration configuration 201 of the messenger server 20 registers and manages the bot server 310 to be identified with the messenger server 20.

A relay interface configuration 202 and a request received message configuration 203 are divided according to which communication method is to be applied to the bot server 310.

The messenger server 20 provides a way by which the bot server 310 corresponding to a 3rd party approaches.

The messenger server 20 includes the relay interface configuration 202 so that the messenger server 20 may send, e.g., automatically send a user message transmitted from a messenger application of the mobile device 10 to an implement relay interface configuration 311 of the bot server 310.

The messenger server 20, which is an open application programming interface (API), may respond to a message according to a request of a receive message fetcher configuration 312. The bot server 310 leadingly operates as a fetcher that fetches the user message received by the messenger server 20.

When the user message is sent from the messenger server 20 to the bot server 310 as described above, the bot server 310 parses the user message and internally generates a response message in response to the user message. A message sender configuration 313 of the bot server 310 calls the open API of the messenger server 20 to send the response message to a send message configuration 204 of the messenger server 20, so that the messenger server 20 is requested to send the response message to the messenger application of the mobile device 10.

FIG. 2C is a table illustrating an action map used to parse a user message in the bot server 310 according to an embodiment.

The bot server 310 separates texts included in the user message sent from the messenger server 20 according to words. The words separated from the texts correspond to tokens. The tokens may be mapped to actions defined in the action map.

For example, when a token "프린터" or "printer" is included in the texts included in the user message, the bot server 310 parses the token to be mapped to an action "PRINTER". When a token "찾기" is included in the texts included in the user message, the bot server 310 parses the token to be mapped to an action "SEARCH".

In other words, the bot server 310 construes meaning of the texts included in the user message, and a user converts the meaning into a control command for the image forming apparatus 40.

FIG. 2C illustrates exemplary tokens and actions. In addition to the action map of FIG. 2C, various tokens and actions may be provided.

Referring to FIG. 2A, the print service server 330 controls and manages the image forming apparatus 40 provided to the image forming system 1. Although only one image forming apparatus 40 is provided in the present embodiment for convenience of description, various image forming apparatuses may be provided to the image forming system 1, other than the image forming apparatus 40. That is, the print service server 330 may control and manage all image forming apparatuses provided to the image forming system 1.

The print service server 330 registers identification information of the image forming apparatus 40 provided to the image forming system 1 to control an operation of the image forming apparatus 40. The print service server 330 maps and registers user identification information with respect to information regarding the image forming apparatus 40.

Figure 3A:
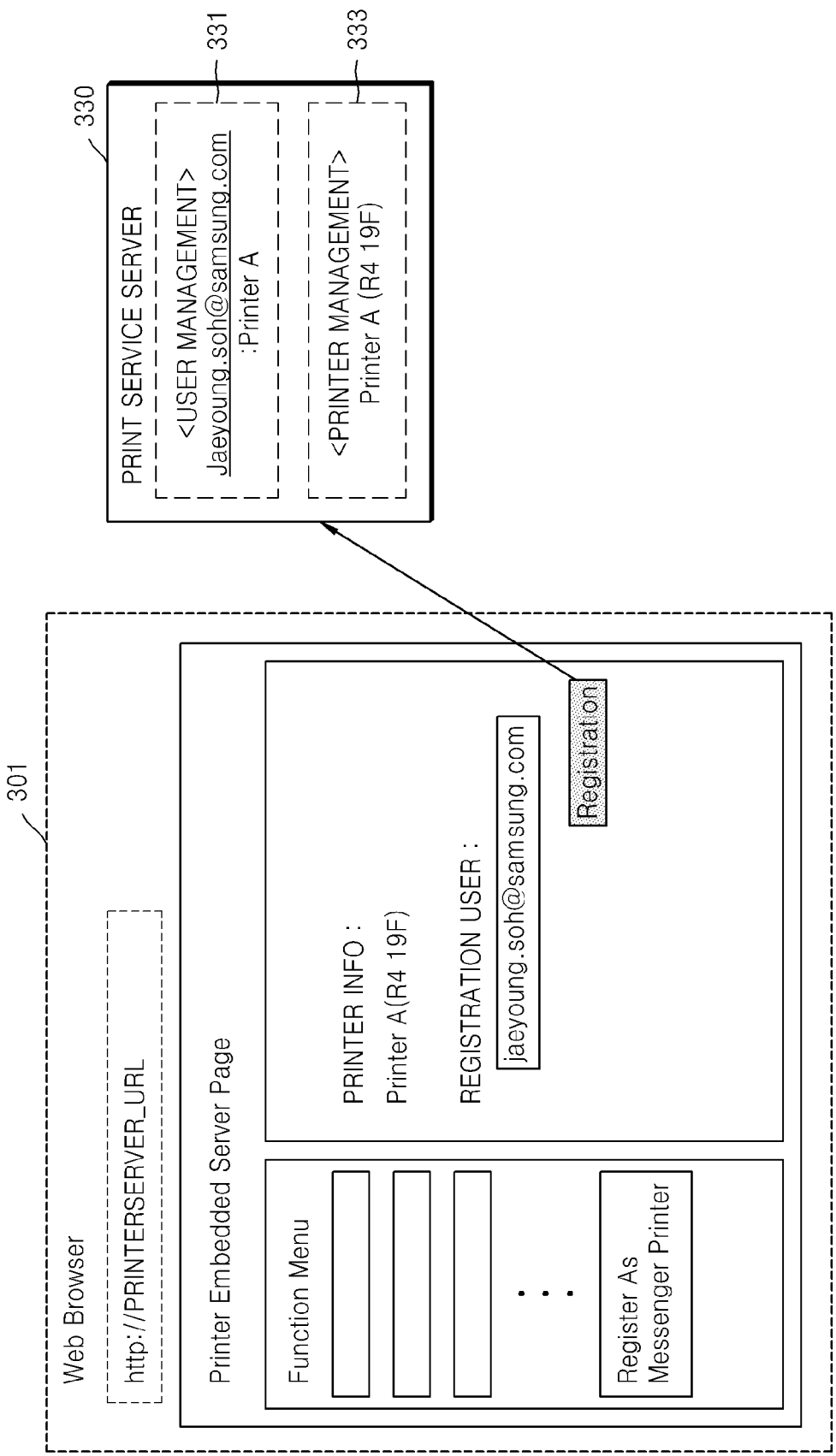
FIGS. 3A and 3B illustrate a registration of identification information of an image forming apparatus and a user to a print service server according to an embodiment.
Figure 3B:
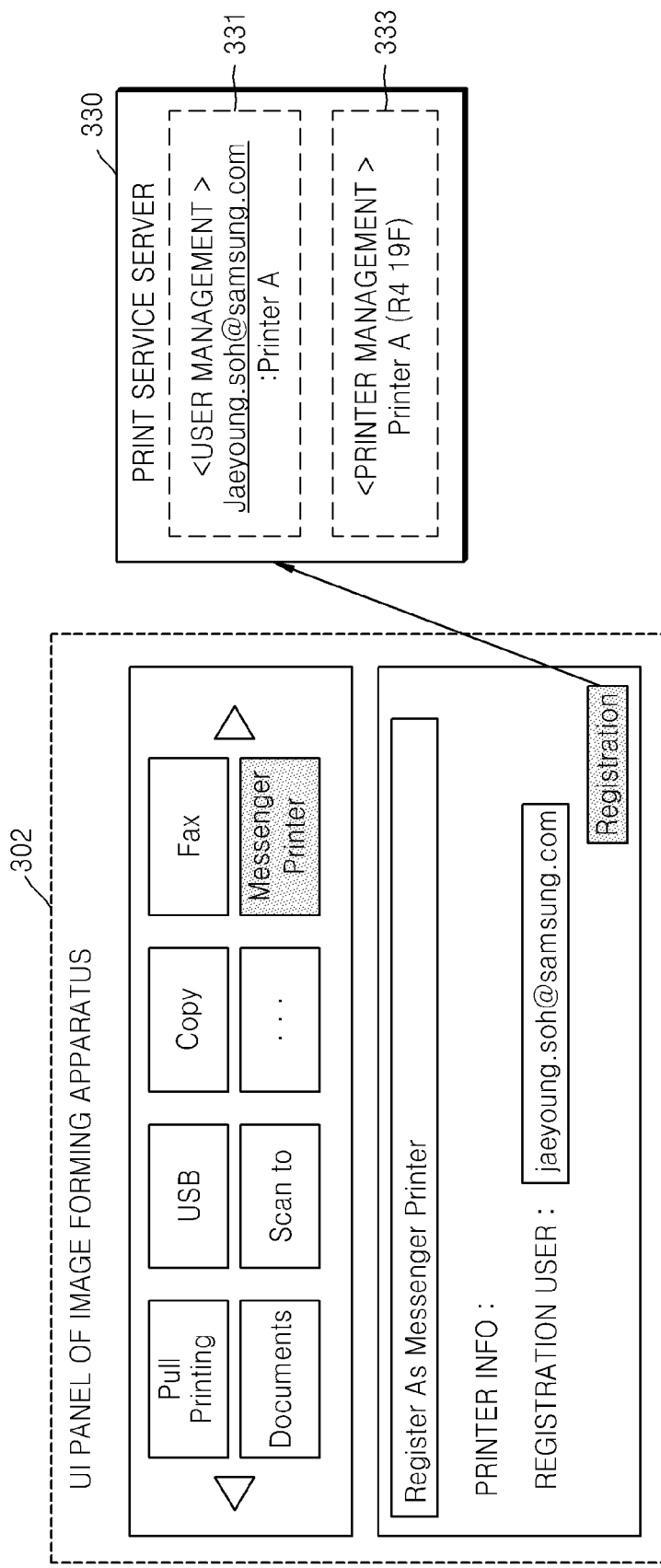

FIGS. 3A and 3B illustrate a registration of identification information of the image forming apparatus 40 and a user to the print service server 330 according to an embodiment.

Referring to FIG. 3A, the user may access a web page 301 provided by an embedded web server of the image forming apparatus 40 to register the identification information of the image forming apparatus 40 and the user.

The user may input their e-mail address and information regarding the image forming apparatus 40 that are to be registered by using the web page 301. That is, for example, the user may input their e-mail address "jaeyoung.soh@samsung.com" and designate "Printer A (R4 19F)" as the image forming apparatus 40 that is to be mapped to the e-mail address "jaeyoung.soh@samsung.com".

When the user clicks a registration button on the web page 301, the user maps and registers information regarding the e-mail address "jaeyoung.soh@samsung.com" and the image forming apparatus 40 "Printer A (R4 19F)" to the print service server 330 as user management information 331 and printer management information 333, respectively.

The user may register user identification information by using a user interface (UI) panel 302 of the image forming apparatus 40.

The user may input information regarding their e-mail address in the image forming apparatus 40 "Printer A (R4 19F)". That is, for example, when the user inputs their e-mail address "jaeyoung.soh@samsung.com" and clicks the registration button, the information regarding the e-mail address "jaeyoung.soh@samsung.com" and the image forming apparatus 40 "Printer A (R4 19F)" may be mapped and registered to the print service server 330 as the user management information 331 and the printer management information 333, respectively.

Referring to FIG. 2A, the print service server 330 may control the image forming apparatus 40 or manage a status of the image forming apparatus 40 according to actions that are indicated by user messages parsed by the bot server 310.

For example, when the actions that are indicated by the user messages parsed by the bot server 310 correspond to the actions "PRINTER" and "SEARCH", the print service server 330 may return a list of image forming apparatuses that are currently connected to a network of the image forming system 1 back to the bot server 310.

Alternatively, when the actions that are indicated by the user messages parsed by the bot server 310 correspond to an action "PRINT", the print service server 330 may control the image forming apparatus 40 to perform a printing function.

When the actions that are indicated by the user messages parsed by the bot server 310 correspond to the action "PRINT", the print service server 330 may perform rendering for generating printing data as a cloud printing function, and send the rendered printing data to the image forming apparatus 40.

Alternatively, when the actions that are indicated by the user messages parsed by the bot server 310 correspond to actions "RESOURCE" and "CHECK", the print service server 330 may return information regarding an amount of toner currently remaining in the image forming apparatus 40 back to the bot server 310.

That is, the messenger server 20, the cloud server 30, and the image forming apparatus 40 process the user messages transmitted from the mobile device 10 and send response messages in response to the user messages to the mobile device 10 again, in order to allow a user account and an account of the image forming apparatus 40 to automatically converse with each other on the messenger application.

Figure 4:
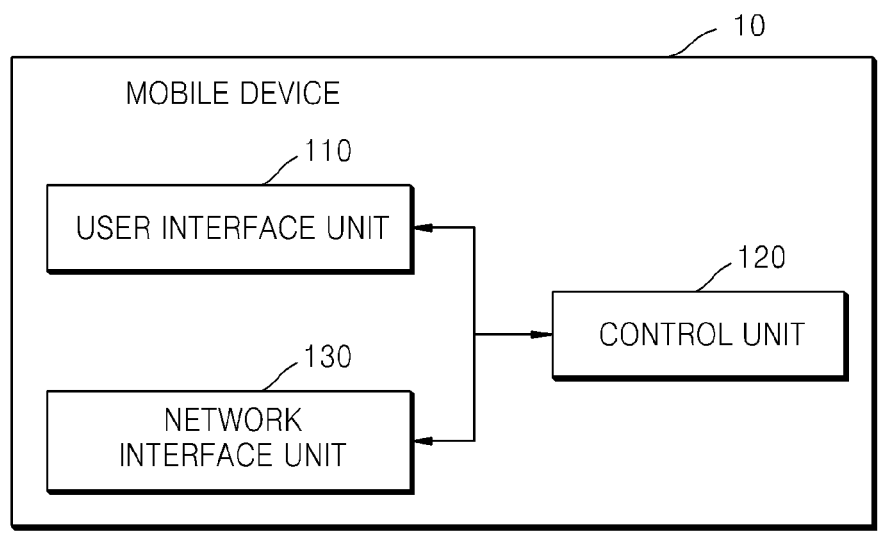
FIG. 4 illustrates a hardware configuration of a mobile devices according to an embodiment.

FIG. 4 is a block diagram of a detailed hardware configuration of the mobile devices 10 according to an embodiment.

Referring to FIG. 4, the mobile device 10 includes a user interface unit 110, a control unit 120, and a network interface unit 130 according to an embodiment. However, it will be understood by one of ordinary skill in the art that general-use hardware components, other than the hardware components shown in FIG. 4, may also be provided.

The user interface unit 110, which is a hardware component including an input apparatus or a display apparatus, displays information to a user of the mobile device 10 or receives information from the user. The user interface unit 110 may include some or all individual apparatuses that interface with the user, such as a display screen, a speaker, a key pad, a keyboard, a mouse, and the like, and may also include a touch screen, etc.

The user may execute a messenger application via the user interface unit 110. The user interface unit 110 displays information displayed by the executed messenger application to the user. The user may input messages to the messenger application via the user interface unit 110 to chat with other users or an account of the image forming apparatus 40.

The control unit 120 is a hardware component that controls a general operation and function of the mobile device 10. The control unit 120 controls an execution of the message application installed in the mobile device 10.

The control unit 120 may be implemented as at least one processor, such as a central processing unit (CPU), an application processor (AP), etc.

The network interface unit 130 that may support wired communication, 2G mobile communication, 3G mobile communication, 4G mobile communication, etc. is a hardware component that supports a wired or wireless communication function. The network interface unit 130 may support wireless communication, such as Wi-Fi, Wi-Fi Direct, near field communication (NFC), Bluetooth, etc., and wired communication, 2G mobile communication, 3G mobile communication, 4G mobile communication, etc. via Ethernet.

An operation of the mobile device 10 of exemplary embodiment is described in more detail below.

The user interface unit 110 displays the messenger application executed by the control unit 120.

When the user requests that a chat window with an account of the image forming apparatus 40 corresponding to the image forming apparatus 40 be opened on the messenger application, the user interface unit 110 activates a chat UI to interface with the account of the image forming apparatus 40 on the messenger application.

The activated chat UI may correspond to a chat window for chatting with the account of the image forming apparatus 40 one-to-one. Alternatively, the activated chat UI may correspond to a chat window for chatting with the cloud server 30 that manages the account of the image forming apparatus 40 and accounts of other image forming apparatuses. Alternatively, the activated chat UI may correspond to a group chat window for chatting with each of the accounts of other image forming apparatuses one-to-N (where N is a natural number equal to or greater than 2).

The network interface unit 130 sends user messages to control a printing function of the image forming apparatus 40 that are input via the activated chat UI. The messenger application may correspond to an application provided by the messenger server 20 as described above, and thus the user messages may be preferentially sent to the messenger server 20.

For example, when a message including an image that is to be printed is input via the activated chat UI, the network interface unit 130 sends the image that is to be printed to the image forming apparatus 40. The image that is to be printed may be sent to the image forming apparatus 40 via the messenger server 20 and the cloud server 30.

The control unit 120 communicates with the image forming apparatus 40, for example, in a conversational manner according to response messages of the account of the image forming apparatus 40 in response to the input user messages, thereby controlling the printing function of the image forming apparatus 40.

The account of the image forming apparatus 40 may be managed by the bot server 310. The response messages may be generated by the bot server 310 and sent to the mobile device 10.

That is, the user messages and the response messages may be transmitted and received via mediation of the cloud server 30 that manages the image forming apparatus 40.

Figure 5:
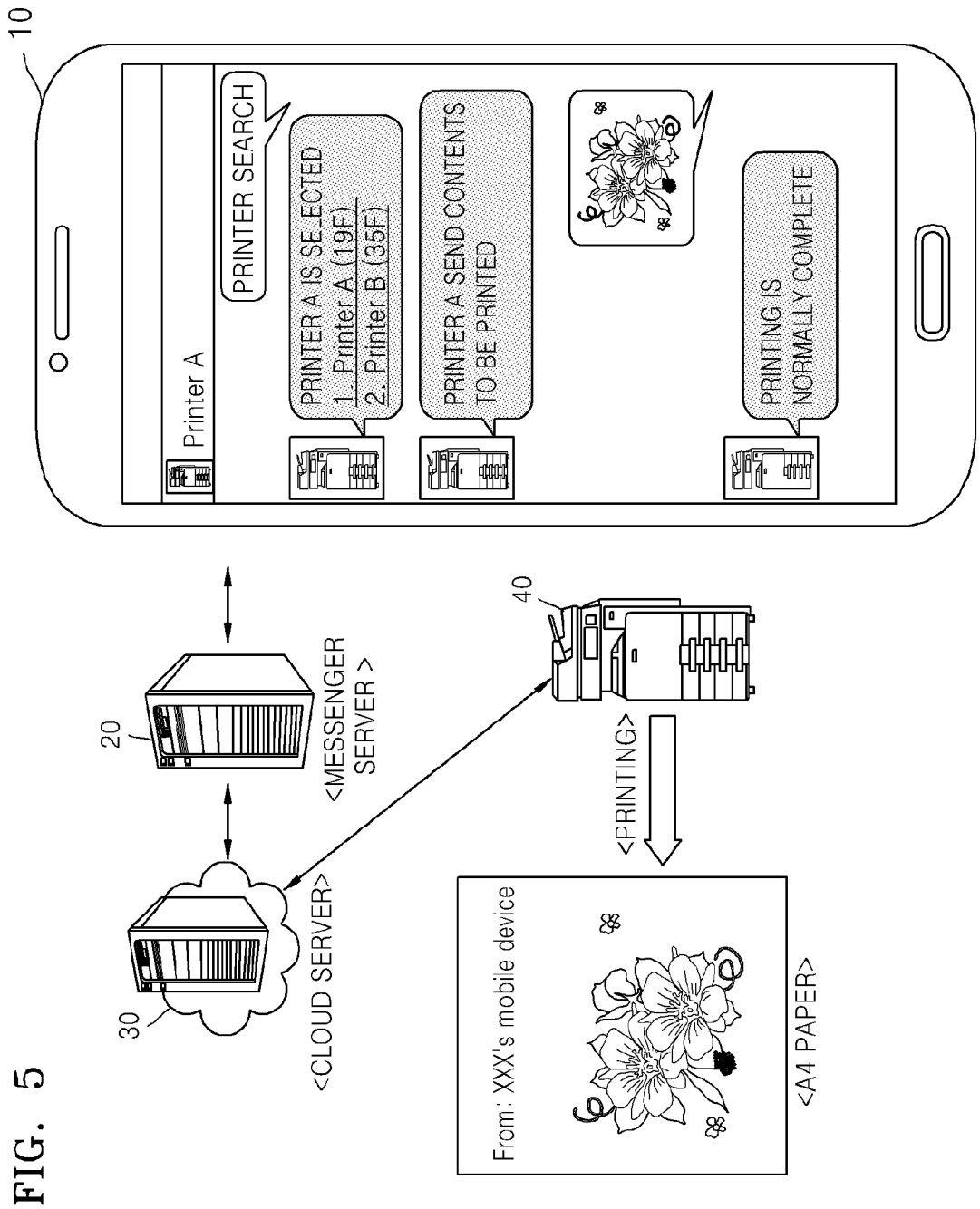
FIG. 5 illustrates a user interface (UI) screen that converses with an image forming apparatus by using a messenger application of a mobile device according to an embodiment.

FIG. 5 illustrates a UI screen that converses with the image forming apparatus 40 by using a messenger application of the mobile device 10 according to an embodiment.

Referring to FIG. 5, Printer A and a chat window are activated in the mobile device 10 that is currently executing a messenger application.

A user may input a user message "printer search" via the user interface 110 to send the user message "printer search" to an account of Printer A.

The input user message "printer search" may be sent to the messenger server 20 via the network interface unit 130. The messenger server 20, as described with reference to FIG. 2B above, sends the user message "printer search" to the bot server 310.

The bot server 310 parses and converts the user message "printer search" into actions corresponding to the user message "printer search" by using the action map, for example, of FIG. 2C.

The print service server 330 collects information regarding Printer A and Printer B that are currently connected to the print service server 330, for example, based on the actions "PRINTER" and "SEARCH" corresponding to the user message "printer search".

The print service server 330 transmits the information regarding the Printer A and Printer B to the bot server 310. The bot server 310 returns a response message such as "Select a printer. 1. Printer A(19F) 2. Printer B(35F)" based on the information regarding the Printer A and Printer B back to the mobile device 10 via the messenger sever 20.

When the response message regarding a list of image forming apparatuses is returned, the user may select a desired object from the list of image forming apparatuses. For example, the user may input a user message "1" via the user interface unit 110 to select Printer A.

Thereafter, the messenger server 20, the bot server 3310, and the print service server 330 send a message of an image that was sent from the user and is to be printed to the image forming apparatus 40 "Printer A", to allow the image forming apparatus 40 to perform a printing function with respect to the image.

The messenger server 20, the bot server 3310, and the print service server 330 may additionally send response messages that guide a printing process to the mobile device 10 during the printing process. The user interface unit 110 may display the response messages on the messenger application.

Figure 6A:
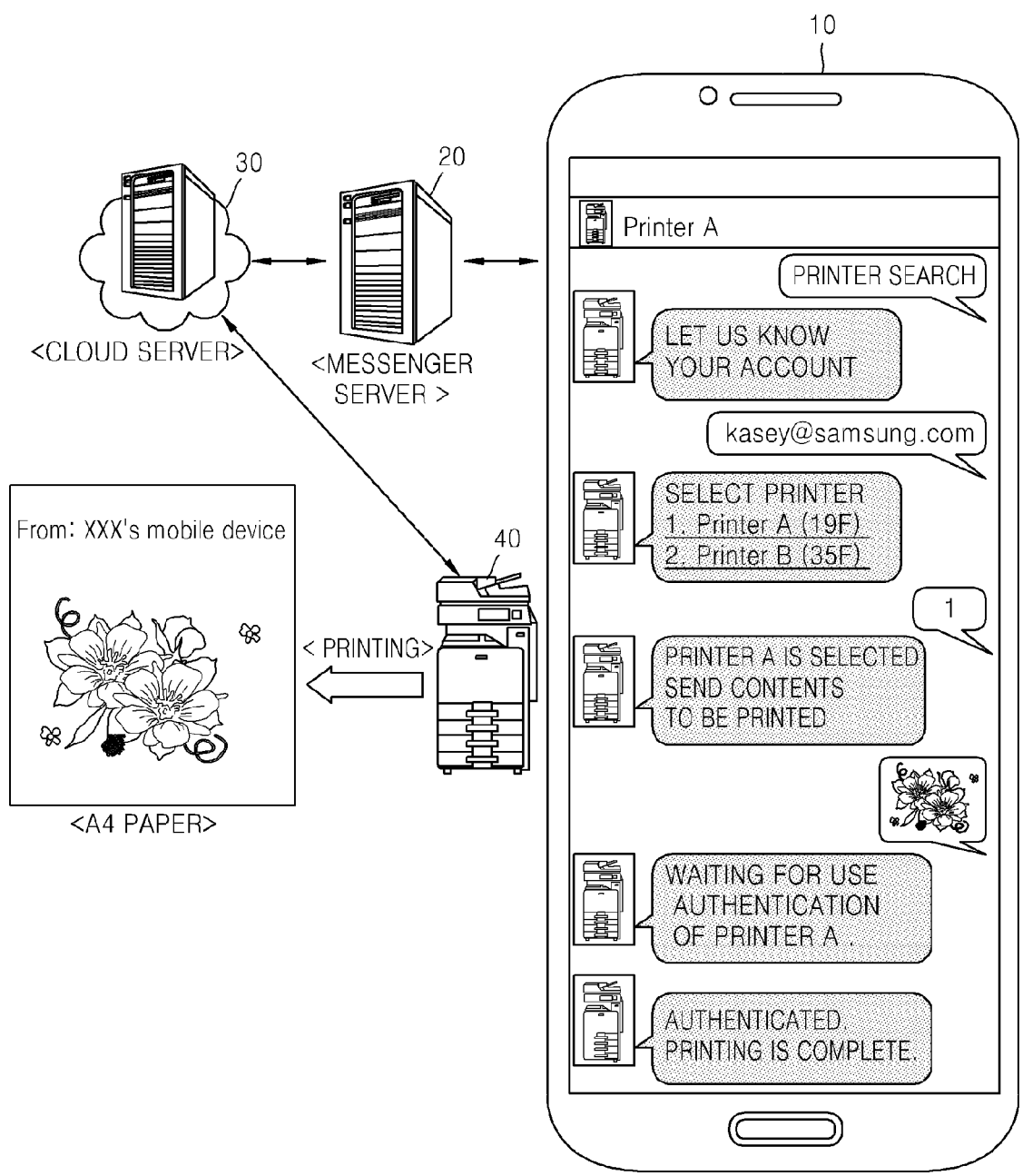
FIGS. 6A and 6B illustrate a process of controlling a printing function of an image forming apparatus by using a messenger application of a mobile device, which is performed in an image forming system according to an embodiment.
Figure 6B:
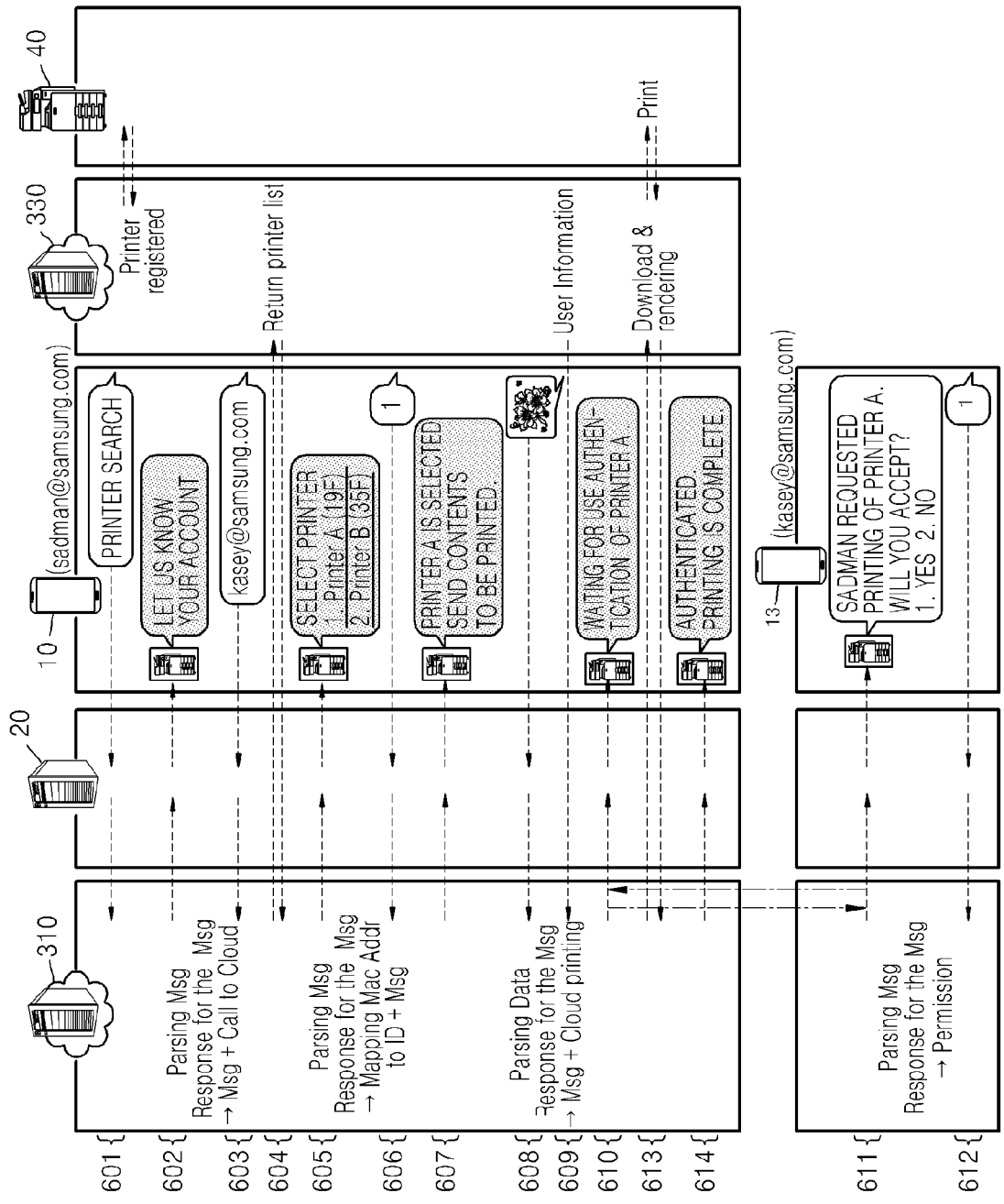

FIGS. 6A and 6B illustrate a process of controlling a printing function of the image forming apparatus 40 by using a messenger application of the mobile device 10, which is performed in the image forming system 1 according to an embodiment.

Referring to 6A and 6B, a user of the mobile device 10 uses an e-mail address "sadman@samsung.com", and a user of a mobile device 13 uses an e-mail address "kasey@samsung.com".

Printer A (the image forming apparatus 40), for example, may be already registered to the print service server 330. Printer B (not shown), for example, may be already registered to the print service server 330.

In operation 601, the mobile device 10 receives a user message "printer search" from the user. The user message "printer search" is sent to the messenger server 20 via the network interface unit 130. The messenger server 20 sends the user message "printer search" to the bot server 310.

In operation 602, the bot server 310 parses and converts the user message "printer search" into actions corresponding to the user message "printer search" by using the action map of FIG. 2C.

The bot server 310 converts a response message that inquires about whose user account is used to log in to the messenger server 20 before transferring the actions "PRINTER" and "SEARCH" corresponding to the user message "printer search" to the print service server 330. The messenger server 20 sends a response message "let us know an account to be used" to the mobile device 10.

In operation 603, the mobile device 10 receives a user message of a user account "kasey@samsung.com" from the user. The user message of the user account "kasey@samsung.com" is sent to the messenger server 20 via the network interface unit 130. The messenger server 20 sends the user message of the user account "kasey@samsung.com" to the bot server 310.

In operation 604, the bot server 310 requests the print service server 330 to transfer a list of image forming apparatuses that are to be mapped to the user account "kasey@samsung.com". The print service server 330 returns information regarding the list of Printer A (the image forming apparatus 40) and Printer B (not shown) that are currently connected to the print service server and are mapped to "kasey@samsung.com" back to the bot server 310.

In operation 605, the bot server 310 returns a response message such as "Select a printer. 1. Printer A(19F) 2. Printer B(35F)" based on the information regarding the list of the Printer A and Printer B back to the messenger sever 20. The messenger server 20 sends the response message such as "Select a printer. 1. Printer A(19F) 2. Printer B(35F)" to the mobile device 10.

In operation 606, the mobile device 10 receives a user message "1" for selecting Printer A (the image forming apparatus 40) from the user. The user message "1" is sent to the messenger server 20 via the network interface unit 130. The messenger server 20 sends the user message "1" to the bot server 310.

In operation 607, the bot server 310 parses and converts the user message "1" into actions corresponding to the user message "1" by using the action map of FIG. 2C.

The bot server 310 returns a response message indicating that an action "SELECTION" corresponding to the user message "1" is determined to the messenger server 20. The messenger server 20 sends a response message "Printer A is selected. Send contents to be printed" to the mobile device 10.

In operation 608, the mobile device 10 receives a user message regarding an image that is to be printed from the user. The user message including the image is sent to the messenger server 20 via the network interface unit 130. The messenger server 20 sends the user message including the image to the bot server 310.

In operation 609, the print service server 330 returns information regarding the user account "kasey@samsung.com" back to the bot server 310. This is because the user account (sadman@samsung.com) of the mobile device 10 may be different from the user account ("kasey@samsung.com) mapped to the Printer A. Thus, authentication of the mobile device 13 having the user account ("kasey@samsung.com) may be required.

In operation 610, the bot server 310 returns a response message "Waiting for use authentication of Printer A" informing that authentication of the mobile device 13 is required back to the messenger server 20. The messenger server 20 sends the response message "Waiting for use authentication of Printer A" to the mobile device 10.

In operation 611, the bot server 310 returns a response message "Sadman requested for printing of Printer A. Will you accept? 1. Yes 2. No" informing that authentication of the mobile device 13 is required back to the messenger server 20. The messenger server 20 sends the response message "Sadman requested for printing of Printer A. Will you accept? 1. Yes 2. No" to the mobile device 13 having the user account ("kasey@samsung.com).

In operation 612, the mobile device 13 receives the user message "1" for authenticating use of Printer A (the image forming apparatus 40) from another user. The user message "1" is sent to the messenger server 20 via the network interface unit 130. The messenger server 20 sends the user message "1" to the bot server 310.

In operation 613, Printer A is completely authorized by the user of the mobile device 13, and thus the bot server 310 transmits the image that is to be printed to the print service server 330.

The print service server 330 renders the image that is to be printed to generate and transmit printing data to Printer A (the image forming apparatus 40).

Printer A (the image forming apparatus 40) performs the printing function thereof based on the printing data, thereby printing the image.

In operation 614, the image is completely printed by Printer A (the image forming apparatus 40), and thus the bot server 310 returns a response message "Authenticated. Printing is complete." back to the messenger server 20. The messenger server 20 sends the response message "Authenticated. Printing is complete." to the mobile device 13.

Through operations 601 through 614 above, the mobile device 10 may control the printing function of Printer A (the image forming apparatus 40) for printing the image by using the messenger application.

Figure 7A:
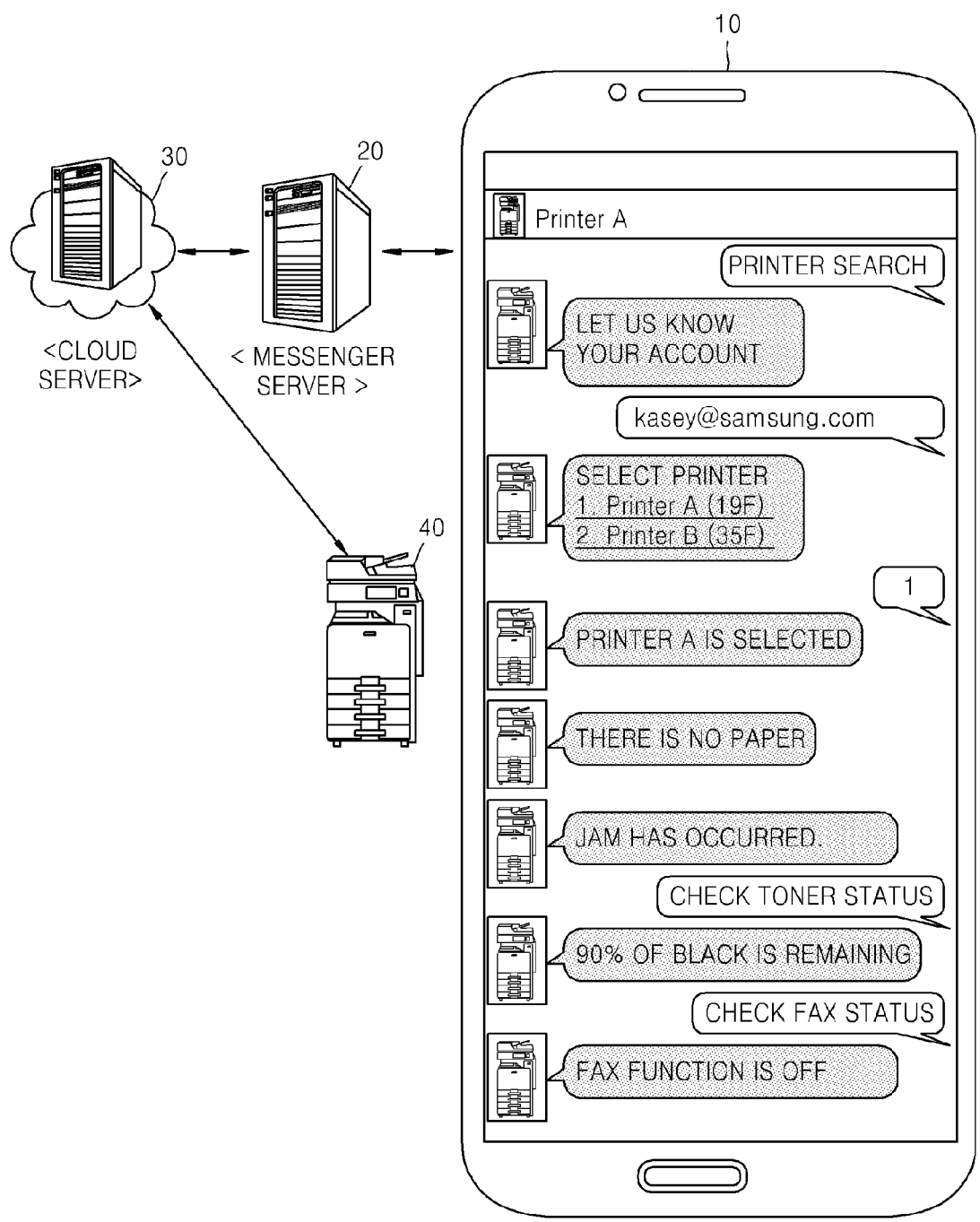
FIGS. 7A and 7B illustrate a process of managing a status of an image forming apparatus by using a messenger application of a mobile device, which is performed in an image forming system according to an embodiment.
Figure 7B:
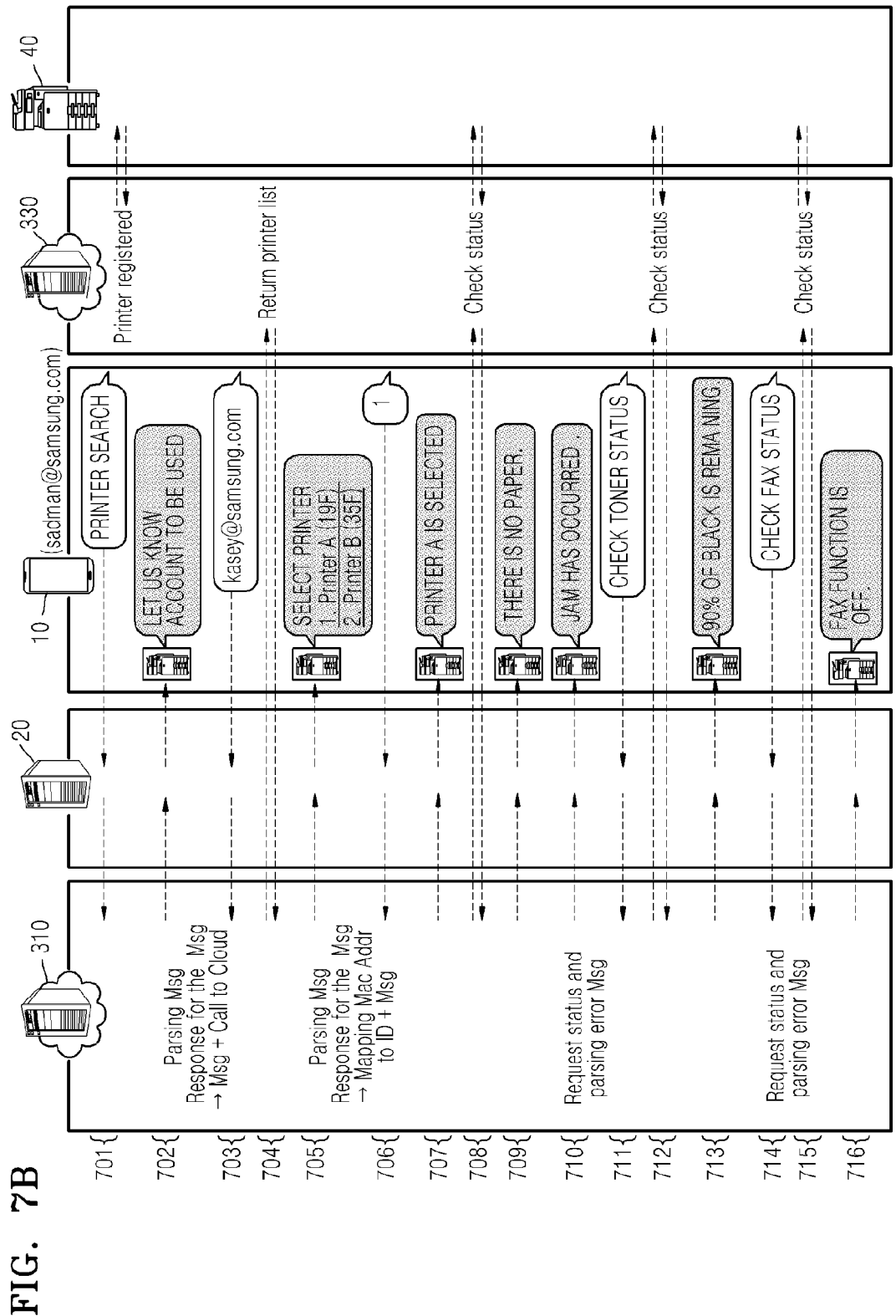

FIGS. 7A and 7B illustrate a process of managing a status of the image forming apparatus 40 by using a messenger application of the mobile device 10, which is performed in the image forming system 1 according to an embodiment.

Referring to 7A and 7B, a user of the mobile device 10 uses an e-mail address "kasey@samsung.com".

Printer A (the image forming apparatus 40) is already registered to the print service server 330. Printer B (not shown) is already registered to the print service server 330.

In operation 701, the mobile device 10 receives a user message "printer search" from the user. The user message "printer search" is sent to the messenger server 20 via the network interface unit 130. The messenger server 20 sends the user message "printer search" to the bot server 310.

In operation 702, the bot server 310 parses and converts the user message "printer search" into actions corresponding to the user message "printer search" by using the action map of FIG. 2C.

The bot server 310 converts a response message that inquires about whose user account is used to log in to the messenger server 20 before transferring the actions "PRINTER" and "SEARCH" corresponding to the user message "printer search" to the print service server 330. The messenger server 20 sends a response message "let us know an account to be used" to the mobile device 10.

In operation 703, the mobile device 10 receives a user message of a user account "kasey@samsung.com" from the user. The user message of the user account "kasey@samsung.com" is sent to the messenger server 20 via the network interface unit 130. The messenger server 20 sends the user message of the user account "kasey@samsung.com" to the bot server 310.

In operation 704, the bot server 310 requests the print service server 330 to transfer a list of image forming apparatuses that are to be mapped to the user account "kasey@samsung.com". The print service server 330 returns information regarding the list of Printer A (the image forming apparatus 40) and Printer B (not shown) that are currently connected to the print service server 330 and are mapped to "kasey@samsung.com" back to the bot server 310.

In operation 705, the bot server 310 returns a response message such as "Select a printer. 1. Printer A(19F) 2. Printer B(35F)" based on the information regarding the list of the Printer A (the image forming apparatus 40) and Printer B back to the messenger sever 20. The messenger server 20 sends the response message such as "Select a printer. 1. Printer A(19F) 2. Printer B(35F)" to the mobile device 10.

In operation 706, the mobile device 10 receives a user message "1" for selecting Printer A (the image forming apparatus 40) from the user. The user message "1" is sent to the messenger server 20 via the network interface unit 130. The messenger server 20 sends the user message "1" to the bot server 310.

In operation 707, the bot server 310 parses and converts the user message "1" into actions corresponding to the user message "1" by using the action map of FIG. 2C.

The bot server 310 returns a response message indicating that an action "SELECTION" corresponding to the user message "1" is determined to the messenger server 20. The messenger server 20 sends a response message "Printer A is selected." to the mobile device 10.

In operation 708, the bot server 310 requests the print service server 330 for information regarding a status of Printer A (the image forming apparatus 40). The print service server 330 returns information indicating that Printer A (the image forming apparatus 40) is currently a paper shortage and a paper jam has occurred back to the bot server 310.

In operation 709, the bot server 310 returns a response message "there is no paper" to the messenger server 20. The messenger server 20 sends the response message "there is no paper" to the mobile device 10.

Accordingly, the user supplies more paper to Printer A (the image forming apparatus 40), thereby managing the status of Printer A (the image forming apparatus 40).

In operation 710, the bot server 310 returns a response message "jam has occurred" back to the messenger server 20. The messenger server 20 sends the response message "jam has occurred" to the mobile device 10.

Accordingly, the user removes a jammed paper from Printer A (the image forming apparatus 40), thereby managing the status of Printer A (the image forming apparatus 40).

In operation 711, the mobile device 10 receives a user message "Check toner status" from the user. The user message "Check toner status" is sent to the messenger server 20 via the network interface unit 130. The messenger server 20 sends the user message "Check toner status" to the bot server 310.

The bot server 310 parses and converts the user message "Check toner status" into the actions "RESOURCE" and "CHECK" corresponding to the user message "Check toner status" by using the action map of FIG. 2C.

In operation 712, the bot server 310 requests the print service server 330 for information regarding a toner status of Printer A (the image forming apparatus 40). The print service server 330 returns information indicating that 90% of black toner currently remains in Printer A (the image forming apparatus 40) back to the bot server 310.

In operation 713, the bot server 310 returns a response message "90% of black is remaining" to the messenger server 20. The messenger server 20 sends the response message "90% of black is remaining" to the mobile device 10.

Accordingly, the user determines the toner status of Printer A (the image forming apparatus 40), thereby managing the status of Printer A (the image forming apparatus 40).

In operation 714, the mobile device 10 receives a user message "Check fax status" from the user. The user message "Check fax status" is sent to the messenger server 20 via the network interface unit 130. The messenger server 20 sends the user message "Check fax status" to the bot server 310.

The bot server 310 parses and converts the user message "Check fax status" into the actions "FAX" and "CHECK" corresponding to the user message "Check fax status" by using the action map of FIG. 2C.

In operation 715, the bot server 310 requests the print service server 330 for information regarding a fax status of Printer A (the image forming apparatus 40). The print service server 330 returns information indicating that a fax function of Printer A (the image forming apparatus 40) is currently deactivated back to the bot server 310.

In operation 716, the bot server 310 returns a response message "fax function is off" to the messenger server 20. The messenger server 20 sends the response message "fax function is off" to the mobile device 10.

Accordingly, the user determines the fax status of Printer A (the image forming apparatus 40), thereby managing the status of Printer A (the image forming apparatus 40).

Through operations 710 through 716 stated above, the mobile device 10 may manage the status of Printer A (the image forming apparatus 40) by using the messenger application.

Figure 8:
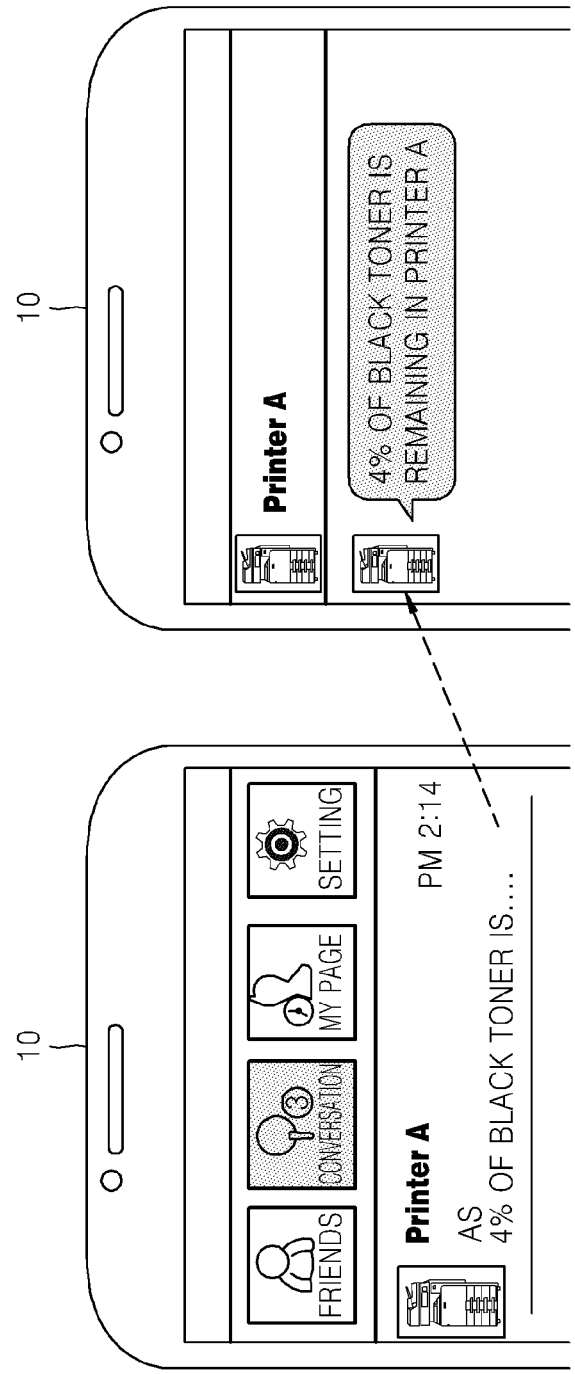
FIG. 8 illustrates a method of receiving monitoring information of a status of an image forming apparatus by using a messenger application of a mobile device according to an embodiment.

FIG. 8 illustrates a method of receiving monitoring information of a status of the image forming apparatus 40 by using a messenger application of the mobile device 10 according to an embodiment.

Referring to FIG. 8, Printer A (the image forming apparatus 40) may push a message indicating monitoring information to the messenger application of the mobile device 10. For example, when Printer A (the image forming apparatus 40) is short of black toner, Printer A (the image forming apparatus 40) may send a push message "4% of black toner currently remains in Printer A" to the mobile device 10. That is, the monitoring information of a status of Printer A (the image forming apparatus 40) may be pushed to the mobile device 10 by using the messenger application like a message sent from an outside individual.

In other words, the print service server 330 may transfer the monitoring information of the status of Printer A (the image forming apparatus 40) to the bot server 310 regularly or when an event occurs in Printer A (the image forming apparatus 40). Accordingly, the bot server 310 may send the message including the monitoring information to the mobile device 10 via the messenger server 20.

Figure 9:
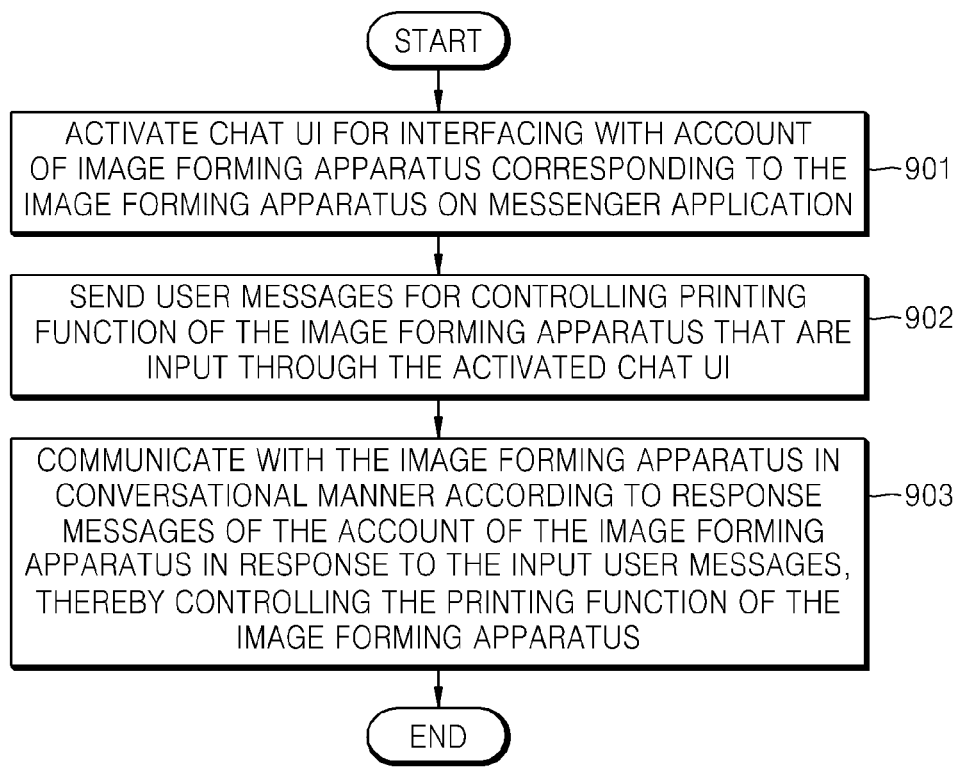
FIG. 9 is a flowchart of a method of controlling an image forming apparatus by using a messenger application of a mobile device according to an embodiment.

FIG. 9 is a flowchart of a method of controlling the image forming apparatus 40 by using a messenger application of the mobile device 10 according to an embodiment.

In operation 901, the user interface unit 110 of the mobile device 10 activates a chat UI to interface with an account of the image forming apparatus 40 corresponding to the image forming apparatus 40 on the messenger application.

In operation 902, the network interface unit 130 of the mobile device 10 sends user messages to control a printing function of the image forming apparatus 40 that are input through the activated chat UI.

In operation 903, the control unit 120 of the mobile device 10 communicates with the image forming apparatus 40 in a conversational manner according to response messages of the account of the image forming apparatus 40 in response to the input user messages, thereby controlling the printing function of the image forming apparatus 40.

Figure 10:
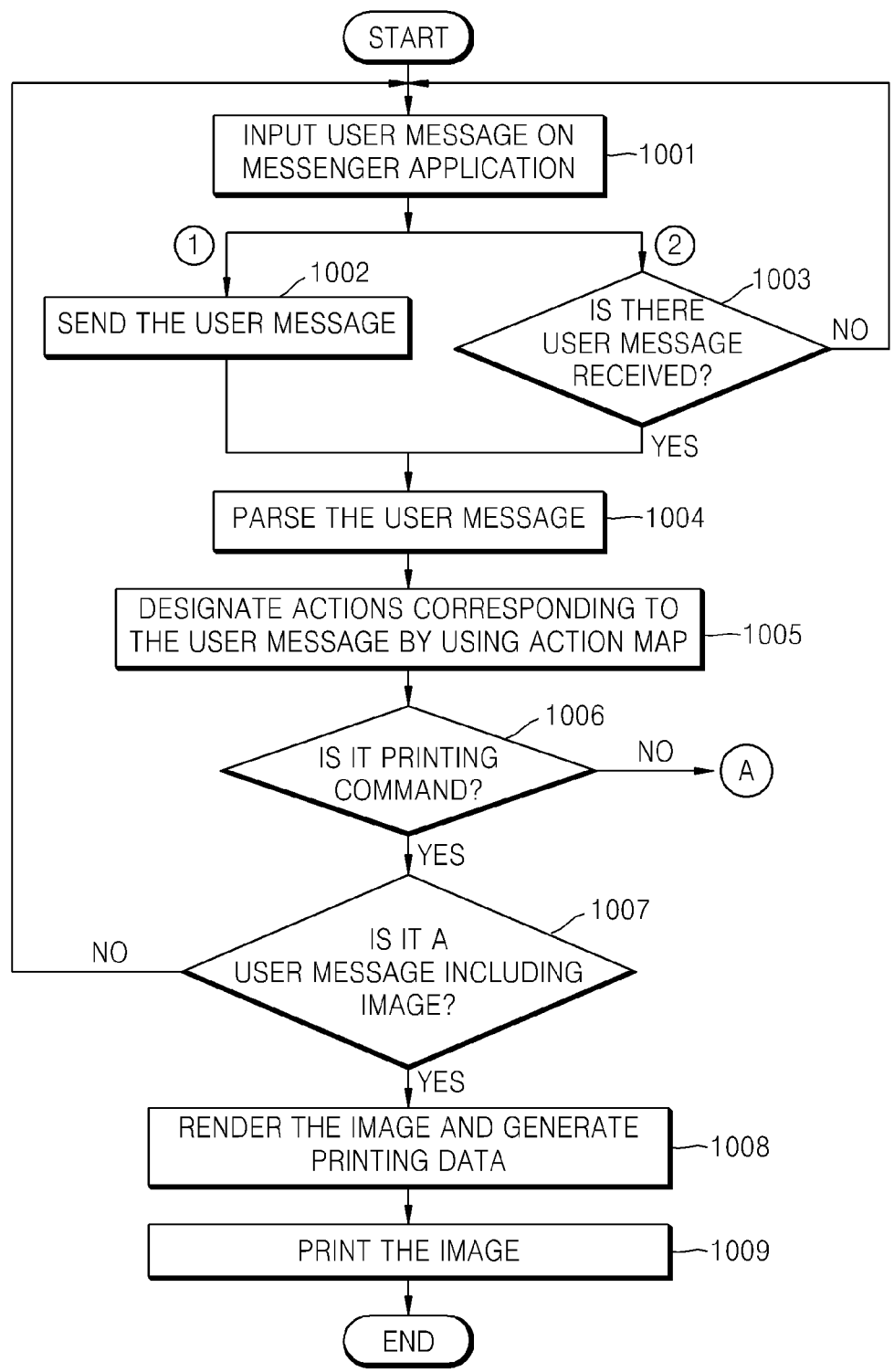
FIG. 10 is a flowchart of a method of managing a printing function of an image forming apparatus by using a messenger application of a mobile device according to an embodiment.

FIG. 10 is a flowchart of a method of managing a printing function of the image forming apparatus 40 by using a messenger application of the mobile device 10 according to an embodiment.

In operation 1001, a user inputs a user message to the messenger application of the mobile device 10.

In operation 1002, the messenger server 20 automatically sends the user message to the bot server 310, as illustrated, for example, by path 2000 of FIG. 2B.

Alternatively, in operation 1003, the bot server 310 inquires whether the messenger server 20 currently receives a message from the mobile device 10, as illustrated, for example, by path 3000 of FIG. 2B. If the messenger server 20 currently receives the message from the mobile device 10, operation 1004 is performed.

Both operations 1002 and 1003, or one of them may be performed according to types of interfaces of the messenger server 20 and the bot server 310.

In operation 1004, the bot server 310 parses the user message. The bot server 310 may parse texts included in the user message as tokens.

In operation 1005, the bot server 310 designates actions corresponding to the user message by using an action map. The bot server 310 may map the tokens parsed from the user message to the actions by using the action map.

Figure 11:
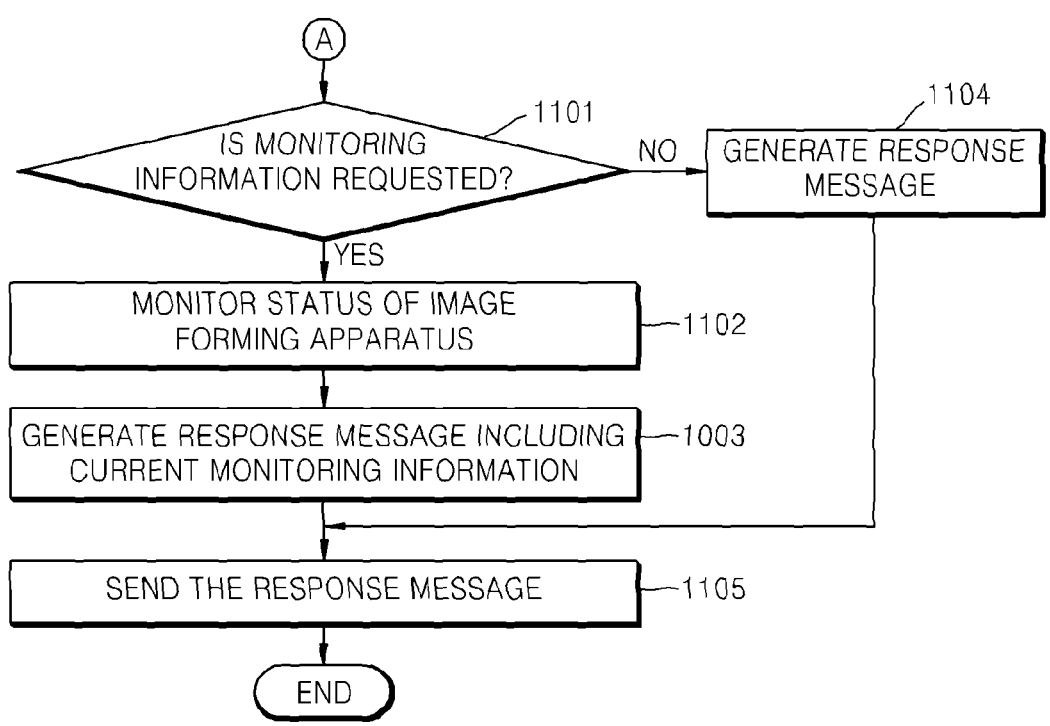
FIG. 11 is a flowchart of a method of managing a status of an image forming apparatus by using a messenger application of a mobile device according to an embodiment.

In operation 1006, the bot server 310 determines whether the user message is a printing command. If the user message is the printing command, operation 1007 is performed. However, if the user message does not mean the printing command, operation A of FIG. 11 is performed.

In operation 1007, the bot server 310 determines whether the user message includes an image that is to be printed. If the user message includes the image, operation 1008 is performed. However, if the user message does not include the image, operation 1001 is performed again in order to input a user message including the image.

In operation 1008, the print service server 330 renders the image included in the user message to generate printing data. That is, the print service server 330 performs cloud rendering.

In operation 1009, the image forming apparatus 40 prints the image by using the generated printing data.

FIG. 11 is a flowchart of a method of managing a status of the image forming apparatus 40 by using a messenger application of the mobile device 10 according to an embodiment.

In operation 1101, the bot server 310 determines whether a user message is a message that requests monitoring information. If the user message is the message that requests the monitoring information, operation 1102 is performed. If not, operation 1105 is performed.

In operation 1102, the print service server 330 monitors the status of the image forming apparatus 40 to collect the monitoring information.

In operation 1103, the bot server 310 generates a response message including current monitoring information based on the collected monitoring information.

In operation 1104, the bot server 310 generates a response message that guides or explains actions mapped by using an action map as a result of parsing the user message.

In operation 1105, the bot server 310 sends the response message to the messenger server 20, and the messenger server 20 sends the response message to the mobile device 10.

According to the one or more embodiments, various types of commercial messenger applications that are installed in a mobile device may be used to control a printing function of an image forming apparatus or monitor information regarding a status of the image forming apparatus by using a method of chatting with the image forming apparatus, thereby more conveniently and intuitively utilizing a function of the image forming apparatus or managing the image forming apparatus.

In addition, an exemplary embodiment may be implemented through computer readable code/instructions in/on a medium, e.g., a computer readable medium, to control at least one processing element to implement any above described embodiment. The medium can correspond to another medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image forming apparatus, comprising:
   at least one hardware processor; and
   a non-transitory machine readable storage medium to store a program to be executed by the at least one hardware processor,
   wherein the program including executable instructions for:
   receiving user identification information of a user through a user interface (UI) panel of the image forming apparatus;
   transmitting identification information of the image forming apparatus and the user identification information to a cloud server;
   registering the image forming apparatus to the cloud server by mapping the identification information of the image forming apparatus and the user identification information; and
   if messages from a mobile device inputted through a messenger application of the mobile device are received from the cloud server, controlling a function of the image forming apparatus based on the messages from the mobile device, wherein the messenger application executes a chat window in which a first account corresponding to the identification information of the image forming apparatus and a second account corresponding to the user identification information participate, and wherein the messages are based on chat messages between the first account and the second account in the chat window.

2. The image forming apparatus of claim 1, wherein the first account corresponding to the image forming apparatus is managed and registered by the cloud server.

3. The image forming apparatus of claim 1, wherein the executable instructions instruction further comprises controlling the transmitter to transmit a status of the image forming apparatus to the cloud server when the messages include a request for collecting monitoring information of the image forming apparatus.

* * * * *